INVENTORS
ROBERT G. DEXTER &
BY ROBERT P. BLAKE

Parrott & Rankin
ATTORNEYS

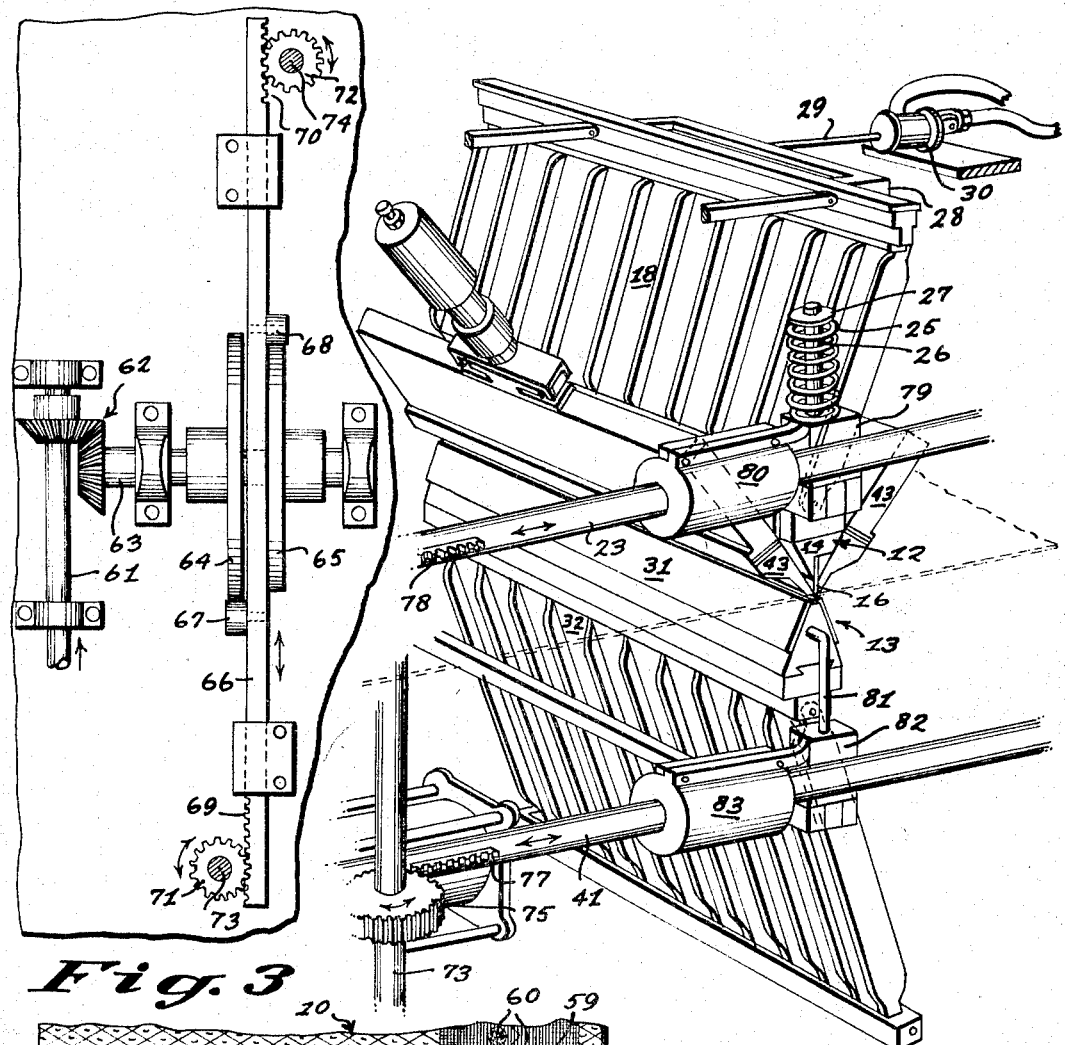

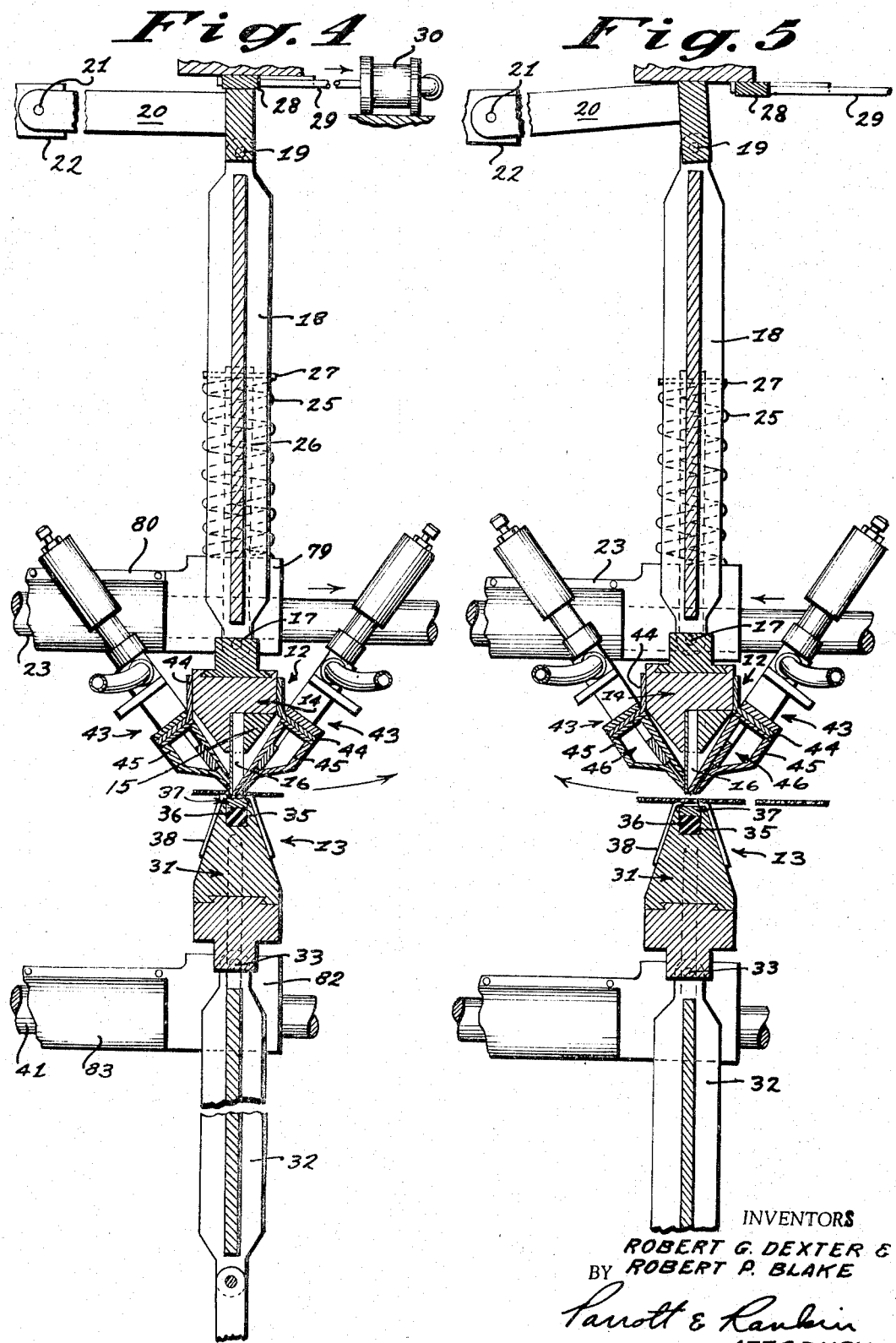

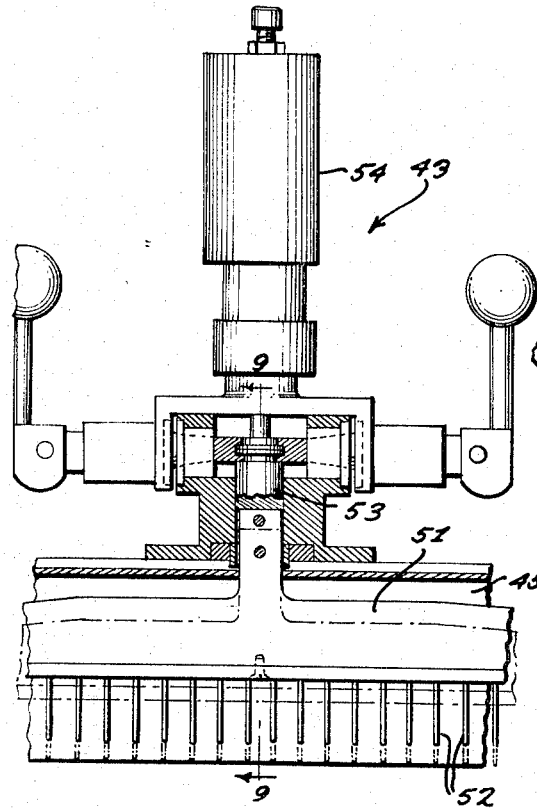
Fig.7
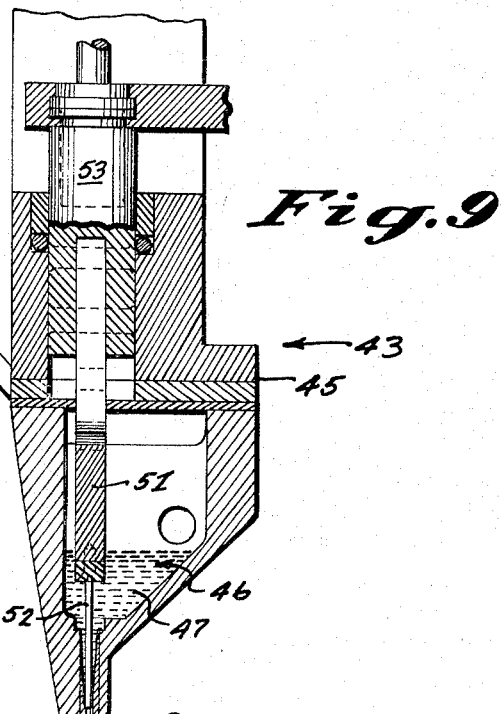
Fig.9
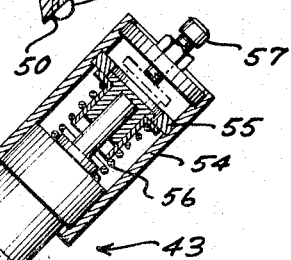
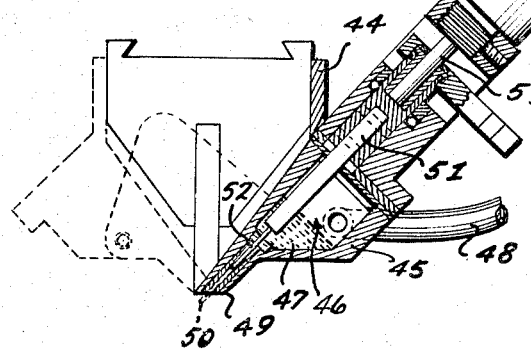
Fig.8
INVENTORS
ROBERT G. DEXTER &
BY ROBERT P. BLAKE
*Parrott & Rankin*
ATTORNEYS

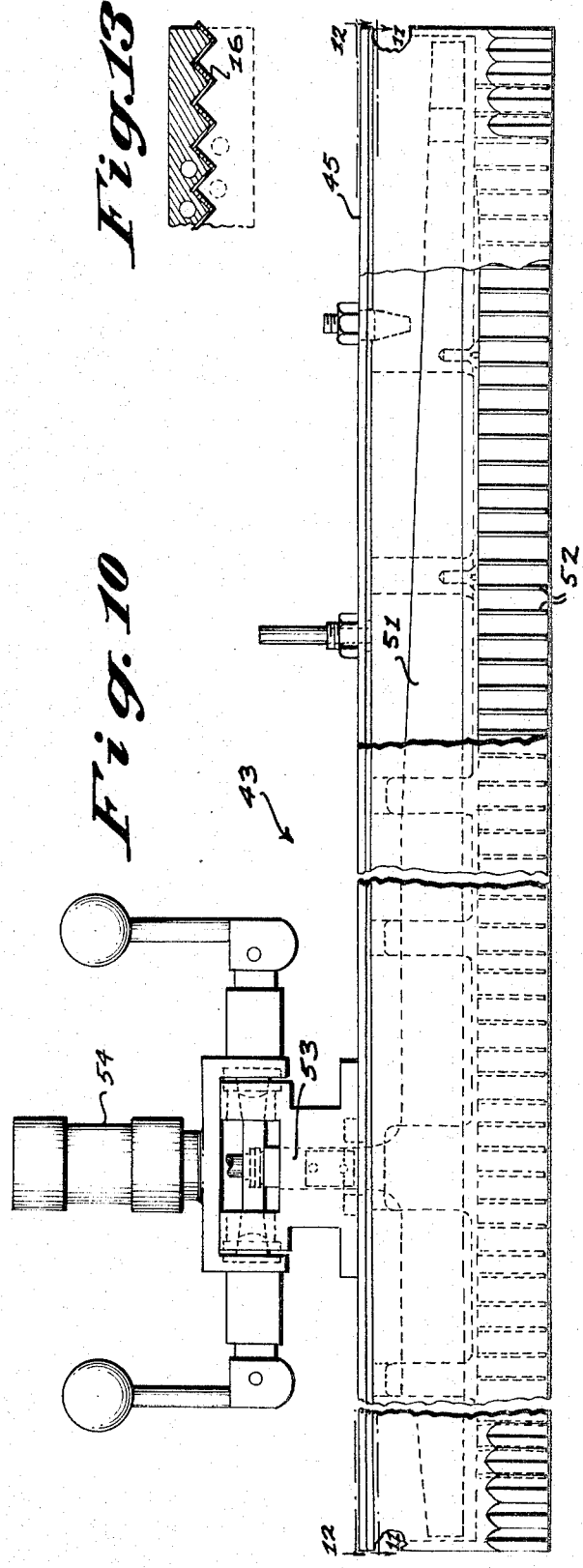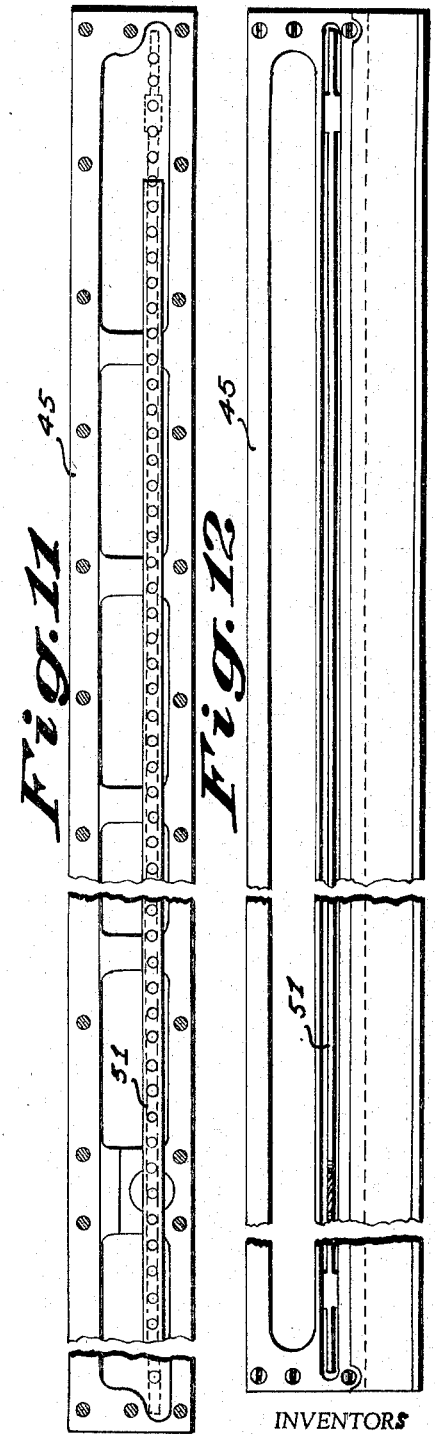

INVENTORS
ROBERT G. DEXTER &
BY ROBERT P. BLAKE

Parrott & Rankin
ATTORNEYS

United States Patent Office 3,320,926
Patented May 23, 1967

3,320,926
CUTTING AND ANTI-RAVEL CHEMICAL
APPLICATOR MECHANISMS
Robert G. Dexter, Harvard, and Robert P. Blake, Winchester, Mass., assignors, by mesne assignments, to Riegel Textile Corporation, New York, N.Y., a corporation of New York
Filed Dec. 31, 1963, Ser. No. 339,836
8 Claims. (Cl. 118—40)

This invention relates to cutting mechanisms and anti-ravel chemical applicator mechanisms. More particularly, it pertains to an improved oscillating cutter blade and oscillating anvil cooperating therewith for cutting individual lengths from a traveling web of textile material, along with an associated anti-ravel chemical applicator for depositing spaced deposits of anti-ravel chemical along the cut edge simultaneously with the cutting of the material.

Heretofore, when using either an oscillating cutter, rotating cutter, or chisel knife, it was customary to use merely an anvil consisting of a stationary anvil, or a roller, or an idler for cooperation with the cutter blade. One of the difficulties encountered in such types of anvils is the eccentricities of the peripheral surface of the anvil and cutter blade. The variations in the peripheral surface of the anvil and cutter blade as a rule are so great as to vary the accuracy of pressure needed to be exerted by the cutter blade in order to cut or sever traveling webs of material passing between such a cutter and anvil. This often results in failure to properly cut or sever light web materials, and was often especially conducive to wear and tear because of the great pressure needed to accommodate the cutting blade edge to variants in the peripheral surface of the anvil and cutter blade.

Generally, it is an object of this invention to overcome the foregoing difficulties and disadvantages and to provide a cutting mechanism which will effectively cut a traveling web of material regardless of the type of material being used. Accordingly, this invention provides a cutter mechanism consisting of an oscillating cutter blade which is so arranged and pivoted as to oscillate along an arcuate path above the traveling web of material. The arcuate path of the cutter blade has a low point slightly below the level of the traveling web of material and it is at this point that the material is cut. Associated with this oscillating cutter blade is an oscillating anvil which is so arranged and pivoted as to also oscillate along an arcuate path below the traveling web of material concurrently with the cutter blade. The arcuate path of the anvil has a high point slightly above the level of the traveling web of material and it is at this point that the material is cut. The arcuate paths of travel of the cutter blade and anvil member interest each other near the respective high and low points so that the traveling web of material will be squeezed between the cutter blade and anvil at that point and sufficient pressure will exist between the cutter blade and the anvil to effectively cut or sever the traveling web of material regardless of the bulk thereof. Provision is made to raise the pivot point of the cutter blade on its return stroke to effect raising of its path of travel to prevent intersecting of the paths of travel of the cutter blade and anvil and thereby prevent cutting of the traveling web of material on the return stroke of the cutter blade and anvil which is in the direction opposite to the travel of the web of material.

The anvil of this invention comprises a rubber-backed anvil including an anvil block having a solid rubber cushioning member therein and a striker plate covering the solid rubber member. The rubber-backed anvil of this invention overcomes the aforementioned difficulties by presenting a surface to the cutter blade which will conform to the variations in the cutting surface of the cutter blade and thereby distribute equal pressure along the entire cutting surface, which was not possible before. Moreover, the solid rubber member will fill the cavity in the block which holds it when pressure is exerted on it by the cutter blade to effectively present a solid, non-resilient surface to the cutter blade which will maintain the pressure between the cutter blade and anvil necessary to cut or sever a diaper from a traveling web of material regardless of the bulk of the material, but which will conform to the eccentricities or variations in the peripheral surface of the cutter blade. This anvil is also highly advantageous by increasing the life of the cutter blade.

In prior times, when a traveling web of material was cut or severed for use as diapers, towels, or the like, a problem of traveling along the cut edges was encountered. This problem was fought by subsequent hemming of the cut edges. However, this method was not desirable because it required an entirely separate, subsequent operation to be performed on the cut edge which was both costly and time consuming and very often the cut edges had already raveled before hemming could be accomplished. Other methods of preventing raveling were tried, such as cutting with a pinking blade to produce a pinked cut edge. While this was a time saving improvement over the hemming of the cut edge, it was not as ravel resistant as the hemmed edge.

In accordance with the present invention, a marked improvement has been made in overcoming these difficulties in preventing the cut edge of diapers, towels, or the like, from raveling. This invention provides means for depositing minute amounts of a ravel resistant chemical at spaced points adjacent the cut edges simultaneously with cutting of the web. Specifically, this is accomplished by providing anti-ravel chemical applicators which are secured on either side of the cutter blade and adapted to travel therewith. These applicators comprise a body portion at least the length of the cut in the web and have a plurality of apertures in the bottom surface. By means which will be later described, small drops of anti-ravel chemical are forced out of these apertures before the cutting of the web and remain on the bottom surfaces of the applicators. When cutting is effected, these applicators are so located on each side of the cutter blade that the drops of anti-ravel chemical on the bottom surface will contact the cut edges and flow into the material by a wicking or absorbing action simultaneously with the cutting of the web to provide spaced deposits of the anti-ravel chemical along the cut edges to prevent raveling thereof after the web is cut.

Further features of the invention will be understood from a consideration of the following more detailed description taken in conjunction with the accompanying drawings, in which:

FIG. 2 is a perspective view of the mechanisms illustrated in FIG. 1;

FIG. 3 is a top plan view of the drive mechanism for the cutter, anvil, and anti-ravel chemical applicator mechanisms;

FIG. 4 is a side elevation view in section illustrating the cutter, anvil, and anti-ravel chemical applicator mechanisms at the respective low and high points of travel in the forward or cutting stroke of their arcuate paths of travel;

FIG. 5 is a side elevation view in section similar to FIG. 4 but showing the mechanisms at their respective low and high points of travel in the return or non-cutting stroke of their arcuate paths of travel;

FIG. 6 is a partial top plan view of the traveling web of material after the web has been cut and the spaced deposits of anti-ravel chemical applied thereto;

FIG. 7 is a partial front view in section of one of the anti-ravel chemical applicators;

FIG. 8 is a side section view of one of the anti-ravel chemical applicators showing its location with respect to the cutter;

FIG. 9 is a view of one of the anti-ravel chemical applicators taken along the lines 9—9 of FIG. 7;

FIG. 10 is an enlarged partial front view in section of one of the anti-ravel chemical applicators similar to FIG. 7 showing the relationship of the parts in the main body portion of the applicator;

FIG. 11 is a view taken along the lines 11—11 of FIG. 10;

FIG. 12 is a view taken along the lines 12—12 of FIG. 10;

FIG. 13 is a bottom view in section of the cutter and anti-ravel chemical applicators;

Figure 1:
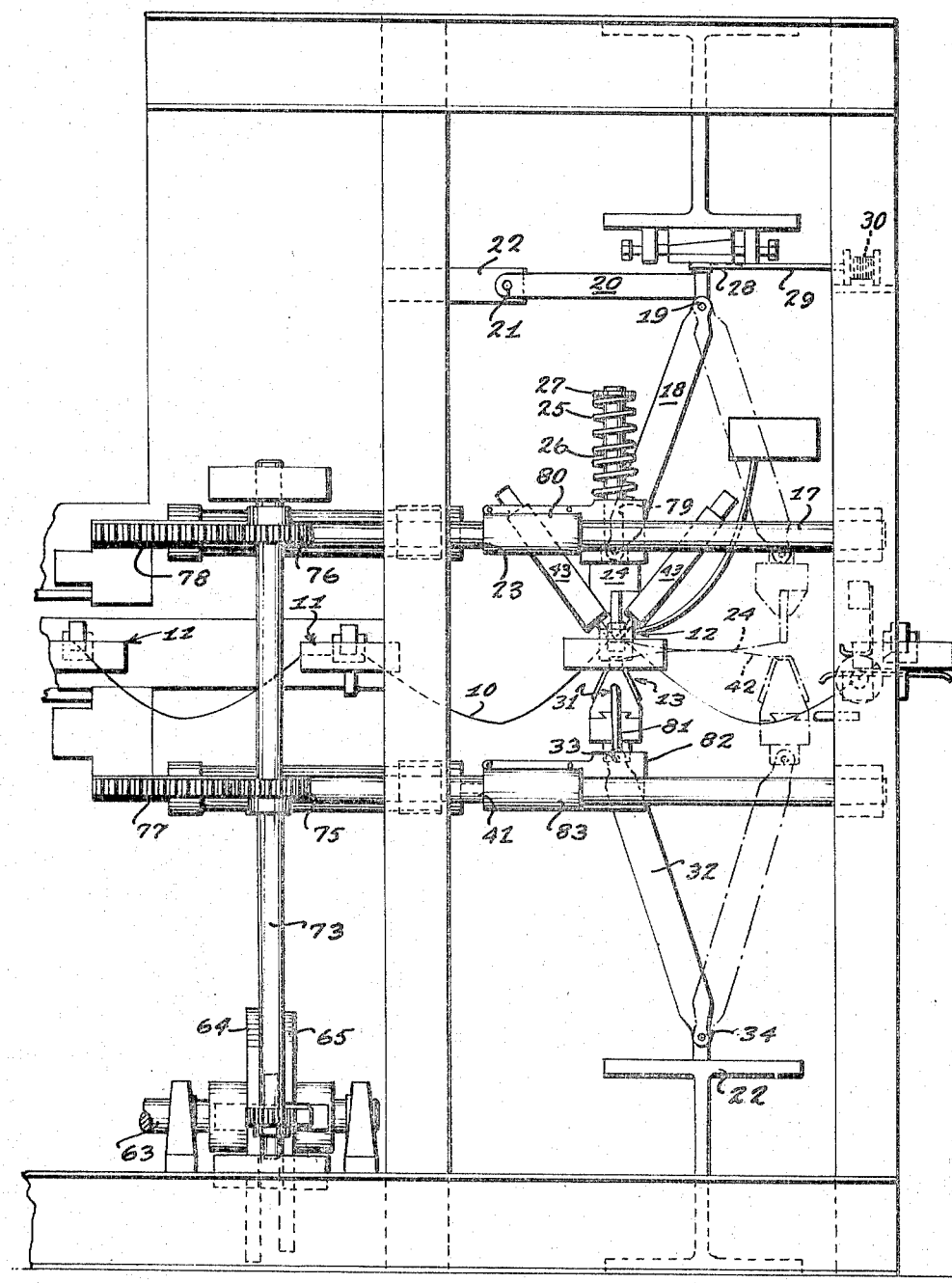
FIG. 1 is a diagrammatic side elevation view of the machine illustrating the cutter, anvil, and anti-ravel chemical applicator mechanisms and showing the drive mechanisms.
Figure 14:
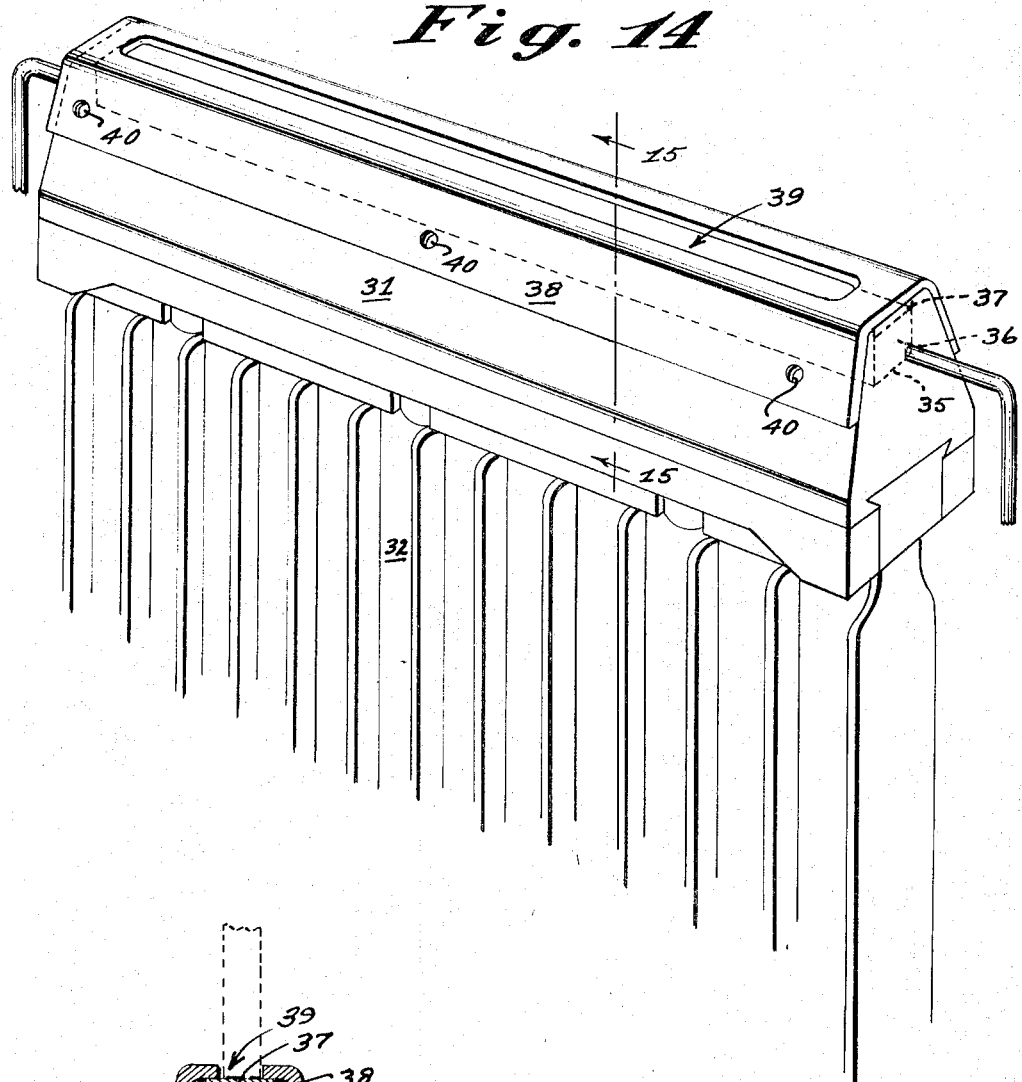
FIG. 14 is a perspective view of the anvil members.
Figure 15:
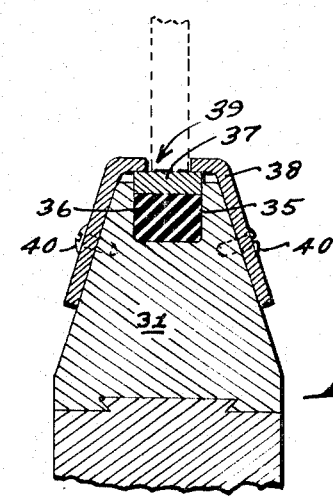
FIG. 15 is a view taken along the lines 15—15 of FIG. 14.

Referring to FIG. 1, a web of material 10 is shown being led to the cutting and anti-ravel chemical applicator mechanisms. This traveling web 10 may be delivered to the above said mechanisms by any convenient means, such as a gripper mechanism 11.

The cutting mechanism, as seen in FIGS. 1, 2, 4 and 5, includes a cutting member 12 and a trapped rubber anvil member 13.

The cutting member 12 consists of a cutter body member 14 including a movable jaw 15. Clamped in the cutter body member 14 by means of a movable jaw 15 is a cutter blade 16, which for purposes of illustration is shown as a pinking cutter blade, as better seen in FIG. 13, but the cutter blade could be any convenient type of cutting blade. The movable jaw 15 may be secured to the cutter body member 14 by any means, such as screws or the like (not shown) to effectively clamp the cutter blade 16. The cutter body member 14 of the cutting member 12 is pivoted at 17 to a cutter toggle member 18. The toggle member, body member, and blade are at least as long as the web of material is wide, as may be seen in FIG. 2. The toggle member 18 is pivoted at 19 to a lever arm 20 which is pivoted at 21 to the stationary machine frame 22. The body member 14, the blade 16, and the toggle 18 are oscillated back and forth in an arcuate path about pivot 19 by a cylindrical cutter carriage member 23 and associated mechanisms which will be described later. The arcuate path of the cutting member 12 in the forward stroke is represented by the dotted line 24 as shown in FIG. 1 and the forward position of the cutting member is shown in phantom in FIG. 1. The body member 14, the cutter blade 16, and the toggle 18 are biased in an upward direction, as view in FIGS. 1, 4, and 5, or in the direction away from the traveling web 10. This bias is obtained by a tension spring 25 surrounding a rod 26 which is rigidly secured to the main body member 14 of the cutter at 17. The spring 25 exerts an upward bias on rod 26 by pushing against a plate 27 fixed to rod 26. The rod 26 is slidably carried in a vertical slide 79 which is integral with a horizontal slide 80 disposed around and fixed to the cylindrical cutter carriage member 23. This arrangement maintains the body member 14 and cutter blade 15 in a horizontal plane regardless of their position in the arcuate path of travel.

For positioning the cutting member 12 there is provided a spacer block 28 having a rod 29 fixed thereto. Rod 29 is connected to a pneumatic cylinder and piston 30. The spacer block 28 is maintained in the position illustrated in FIG. 4 for the forward stroke of the arcuate path of the cutting member 12 to enable the cutting member to follow the lowest arcuate path for cutting of the web 10 on the forward stroke. However, on the return stroke it is not desirable to cut the web 10 because the cutter will be moving in a direction opposite to that of the traveling web of material. Therefore, the pneumatic cylinder and piston 30 will be actuated, by any convenient means, to move the spacer block 28 to the right as shown in FIG. 5. This will allow the cutter member 12 to move upwardly with the bias of spring 25, as seen in FIG. 5, to follow a higher path on the return stroke and thereby avoid contact with the traveling web 10 and eliminate cutting of the web on this return stroke.

Cooperating with the cutter member 12 for severing or cutting the traveling web 10 of material is the trapped rubber anvil member 13 (see FIGS. 1, 2, 4, 5, 14 and 15). The anvil member 13 consists of an anvil body portion 31 pivoted to an anvil toggle 32 at 33. The toggle and anvil body are at least as long as the web of material is wide, as may be seen in FIG. 2. The toggle 32 is pivoted at 34 to the machine frame 22. The anvil body 31 has formed therein a longitudinal, rectangular slot 35 in the upper surface. Contained completely within this slot 35 is a trapped rubber member 36 substantially the same dimensions as the slot 35. Disposed on top of the trapped rubber member 36 and partially confined within the slot 35 is a striker plate 37. The striker plate and trapped rubber member are held in position by bracket 38 fitting into recesses in the striker plate to be flush therewith, having an aperture 39, and being secured to the anvil body 31 by screws 40. The aperture 39 allows the cutter blade 16 to contact the striker plate 37 to cut or sever the web 10. The anvil member 13 is oscillated back and forth in an arcuate path about pivot 34 by a cylindrical anvil carriage member 41 and associated mechanisms which will be described later. The anvil body portion 31 has a rod 81 rigidly secured thereto. This rod is slidably carried in a vertical slide 82 which is integral with a horizontal slide 83 disposed around and fixed to the cylindrical anvil carriage member 41. This arrangement maintains the striking surface of the anvil in the same horizontal plane regardless of its position in the arcuate path of travel. The arcuate path of the anvil member 13 in the forward stroke is represented by the dotted line 42 as shown in FIG. 1 and the forward position of the anvil member is shown in phantom in FIG. 1.

In operation, the cutter member 12 and the anvil member 13 will be oscillated back and forth in their forward and return strokes in unison. The arcuate path 24 of the cutter member 12 will intersect the arcuate path 42 of the anvil member 13 in the forward stroke approximately at the low point of path 24 and the high point of path 42, as may be seen in FIG. 1. When this intersection occurs the web 10 will be cut or severed. The trapped rubber anvil member 13 will present a surface, by way of the striker plate 37 and rubber member 36, to the cutter blade 16 which will conform to any variations in the cutting surface of the cutter blade and will evenly distribute the pressure between the cutter member 12 and anvil member 13 which occurs during cutting of the web 10 due to the intersecting of the arcuate paths of travel 24 and 42 of the cutter member and anvil member. Sufficient pressure is maintained between these two members during this cutting or severing action because the rubber member 36 will completely fill the slot 35 when pressure is exerted on it to effectively present a solid, non-resilient surface to the cutter blade which will maintain the pressure between the cutter member 12 and the anvil 13 necessary to cut or sever the traveling web 10 regardless of the bulk of the material being used for the diapers, but which will also conform to the variations in the surface of the cutter blade 16. On the return stroke of the cutter member 12 and the anvil member 13, the pneumatic piston and cylinder 30 will be actuated to move the spacer block 28 to the right, as shown in FIG. 5.

This will cause the cutter member 12 to be moved upwardly, as seen in FIG. 5, with the bias of spring 25. The cutter member 12 will now traverse a path in the return stroke which will not intersect the arcuate path of the anvil member 13 and therefore, will not cut the web 10 in the return stroke.

Associated with the cutting mechanism are anti-ravel chemical applicators 43, shown in FIGS. 1, 2, 4, 5, and 7–12. These applicators 43 are secured to each side of the cutter body member 14 by brackets 44, as shown in FIGS. 4, 5, and 8. The applicators 43 comprise a hollow applicator body portion 45 having a chemical containing cavity 46 therein. Anti-ravel chemical 47 (see FIGS. 8 and 9) is supplied to the cavity 46 by a supply line 48 from any convenient source of supply (not shown). Leading from the cavity 46 are a plurality of apertures 49 which lead to the bottom surface 50 of the applicators 43. Disposed within the applicator body portion 46 is a plunger carrier 51 which has a plurality of plungers 52 secured thereto. The plunger carrier is secured to a plunger actuator rod 53 which extends into a pneumatic cylinder 54 and double acting piston 55. The piston 55 and therefore rod 53, plunger holder 51, and plungers 52 are biased in an intermediate position by spring 56 as shown in FIG. 8. Air for actuating the piston 55 is supplied to the top of cylinder 54 by supply tube 57 from any convenient source (not shown) and to the bottom of the cylinder 54 by a supply tube (not shown) from any convenient source. The number of plungers 52 corresponds to the number of apertures 49 in the applicator body portion 45 and these plungers are so arranged on the plunger carrier 51 as to be adapted to extend through the apertures 49 when the piston 55 and cylinder 54 are actuated.

The plungers 52 have three active positions which are intermediate, all the way out, and all the way in. The intermediate position, as shown in solid lines in FIG. 8, is the normal position of the plungers 52. This position is maintained by the bias of spring 56 to hold actuator rod 53, plunger carrier 51, and plungers 52 downwardly in the solid line position of FIG. 8. This position of the plungers prevents any chemical 47 from entering the apertures 49. Chemical 47 may now be introduced into the cavity 46 from supply line 48 and the machine cycle may begin.

In operation, the anti-ravel chemical applicators 43 are arranged, as described above, to travel with the cutter member 12 in the cutting strokes thereof. During the return stroke of the cutter member 12, high pressure air is introduced into the top of cylinder 54 which will force the plungers 52, against the bias of spring 56, all the way out the apertures 49, as shown in dotted lines in FIG. 8. The purpose of this stroke of the plungers is to break up and clear out any dried deposits of chemical which may have formed around the aperture 49. The high pressure air is then exhausted and the plungers 52 return to their intermediate positions by the bias of spring 56. Just before cutting on the forward stroke of the cutter member 12, air is introduced into the bottom of the cylinder 54 and the piston 55 is moved upwardly pulling the plungers to their innermost position, shown in dotted lines in FIG. 8. This allows the chemical 47 to enter the apertures 49. The air introduced in the bottom of the cylinder is immediately exhausted and low pressure air is introduced into the top of the cylinder to force the plungers 52 back into their intermediate position. The low pressure air introduced at this point is not strong enough to overcome the bias of spring 56 and will only carry the plungers to their intermediate position. During this stroke of the plungers 52, from the innermost position to the intermediate position, minute drops of anti-ravel chemical 47 will be forced ahead of the plungers through the apertures 49 and held on the outside surface 50 of the applicators 43, as shown in FIG. 9. When the arcuate paths of the cutter member 12 and the anvil member 13 intersect each other to cut or sever the traveling web 10 of material, the drops 58 on the surface 50 of the applicators 43 will contact the web 10 at spaced points on each side of the cut 59 (see FIG. 6) in the web and through a wicking or absorbing action will flow into the material, leaving spaced deposits 60 of anti-ravel chemical along the cut edge 59 and thereby prevent any raveling of the cut edge.

The drive mechanism for driving the cylindrical carriages 23 and 41 for the cutter member 12 and the anvil member 13 comprises a rotating driven shaft 61, as seen in FIG. 3, which is driven by any convenient means, such as an electric motor (not shown). The driven shaft 61 turns, by means of bevel gears 62, a horizontal cam shaft 63. Disposed on cam shaft 63 is a pair of eccentrically disposed cams 64 and 65. These cams 64 and 65 reciprocate a horizontal shaft 66 back and forth by means of cam followers 67 and 68 secured to shaft 66. The reciprocating shaft 66 has teeth 69 and 70 on each end thereof which mesh with pinion gears 71 and 72. Pinion gears 71 and 72 are secured on vertical shafts 73 and 74 and these shafts 73 and 74 are reciprocated back and forth by teeth 69 and 70 and pinion gears 71 and 72. Pinion gears 71 and 72 are secured on vertical shafts 73 and 74 and these shafts 73 and 74 are reciprocated back and forth by teeth 69 and 70 and pinion gears 71 and 72. Vertical shafts 73 and 74 have like connections with carriages 23 and 41 and therefore, only the connections for shaft 73 will be described, as may be seen in FIGS. 1 and 2. Vertical shaft 73 has pinion gears 75 and 76 disposed on the upper end thereof. Pinion gear 75 is reciprocating back and forth by shaft 73 and thereby reciprocates the anvil actuator rod 41 by means of teeth 77 disposed on the anvil actuator rod. Likewise, pinion gear 76 is reciprocating back and forth by shaft 73 and thereby reciprocates the cutter carriage member 23 by teeth 78 disposed on the cutter carriage member. Therefore, this invention has provided a drive for the cutter member 12 which includes anti-ravel chemical applicators 43 and the anvil member 13 which will reciprocate these mechanisms in unison in their forward and return strokes to effect efficient cutting or severing of the traveling web 10 and simultaneous depositing of spaced dots of anti-ravel chemical 60 along the cut edge 59 for obtaining a cut diaper which will not ravel along the cut edges.

This invention has been described in detail with respect to forming diapers, towels, or the like from traveling webs of textile material, but it is to be understood that the principles involved in this invention may be applied to other types of material or products that present similar problems as described above.

This invention is not intended to be limited by the foregoing description or otherwise except as defined in the appended claims.

We claim:

1. A cutting an anti-ravel chemical applicator mechanism comprising a reciprocating cutting means, a reciprocating anvil means cooperating with said cutting means to cut a web of material, an anti-ravel chemical applicator means secured to and reciprocating with said cutting means and adapted to deposit anti-ravel chemical on the reciprocating coating means whereby said chemical is applied along the cut edge of the web simultaneously with the cutting thereof to prevent raveling along said cut edges; means by which said cutting means and said anvil means reciprocate along arcuate paths which intersect each other on the forward stroke to enable cutting of the web on the forward stroke of each at said intersection of paths; and further means for raising the arcuate path of said cutting means on the return stroke to prevent cutting of the web on the return stroke; which comprise a spring mechanism biasing said cutter means in a direction away from the web and, in which, a spacer block is provided for spacing said cutting means in a lower arcuate path during the forward cutting stroke, and a pneumatic piston and cylinder connected to said spacer block for removing said spacer block from said cutting means and thereby allowing the cutting means to be biased upwardly by said spring mechanism in a higher path during the return non-cutting stroke to prevent cutting of the web.

2. A cutting and anti-ravel chemical applicator mechanism, as defined in claim 1, having a stationary frame, in which, said cutting means comprises a cutter body member, a cutter blade clamped in said cutter body, a cutter toggle member pivoted to said cutter body member, and a lever arm pivoted to said cutter toggle member and pivoted to said frame.

3. A cutting and anti-ravel chemical applicator mechanism, as defined in claim 1, having a stationary frame, in which, said anvil means comprises an anvil body portion having a longitudinal slot in the upper surface, a trapper rubber member contained entirely within said slot and substantially the same size as said slot, a striker plate partially contained within said slot and superimposed over said trapped rubber member, a bracket secured to said body portion and overlapping said rubber member and said striker plate to hold them within said slot, and an anvil toggle member pivoted to said body portion and pivoted to said frame.

4. A cutting and anti-ravel chemical applicator mechanism, as defined in claim 1, in which, said anti-ravel chemical applicator means comprises a hollow applicator body portion having a chemical containing cavity therein and a plurality of apertures leading from said cavity to hte outside bottom face of said body portion, a plunger carrier disposed within said hollow body portion, a plurality of plungers secured to said plunger holder and disposed partly within said cavity, said plungers correspond in number to said apertures and are so arranged as to be adapted to extend through said apertures, a plunger actuator rod connected to said plunger carrier and adapted to move said plunger through said apertures to force minute drops of anti-ravel chemical out through said apertures onto the outside bottom face of said body portion for contact with the diaper when the web is cut, and a pneumatic piston and cylinder connected to said plunger actuator rod and adapted to move said rod through its plunger actuating strokes.

5. A reciprocating cutter mechanism having a stationary frame comprising a cutter body member, a cutter blade clamped in said cutter body member, a cutter toggle member pivoted to said cutter body, a lever arm pivoted to said cutter toggle member and to said frame, and a cutter carriage member connected to said cutter body member and adapted to reciprocate said cutter body member and cutter blade back and forth in a forward and return stroke along separate arcuate paths; means for raising the arcuate path of said cutter body and cutter blade on the return stroke of the arcuate path which comprise a spring mechanism biasing said cutter mechanism in a direction away from the arcuate path of the forward stroke and, in which, a spacer block is provided for spacing said cutter mechanism in a lower arcuate path during the forward stroke, and a pneumatic piston and cylinder connected to said spacer block for removing said spacer block from said cutter mechanism and thereby allowing said cutter mechanism to be biased upwardly by said spring mechanism to a higher path during the return stroke; and, an anvil member having an oscillating movement in an arcuate path for coaction with said cutter blade and comprising an anvil body portion having a longitudinal slot in the upper surface, a solid trapped rubber member contained entirely within said slot and substantially the same size as said slot, a striker plate partially contained within said slot and superimposed over said trapped member, and a bracket secured to said body portion and overlapping said rubber member and striker plate to hold them with said slot.

6. A mechanism as in claim 5 wherein said rubber member completely fills said slot upon the application of pressure to provide a striking surface by way of the striker plate for said cutter blade which will maintain sufficient pressure between the anvil member and the cutter blade to ensure cutting but which will conform to any variations in the cutter mechanism to thereby evenly distribute the pressure.

7. A mechanism as in claim 5 including an anti-ravel chemical applicator body which is secured to and travels with said reciprocating cutter and is adapted to dispense a coating material onto the cutter blade whereby to deposit said material into the edge of a web simultaneously with the cutting thereof.

8. A mechanism as in claim 7 wherein said applicator comprises a hollow body portion having a chemical containing cavity therein and a plurality of apertures leading from said cavity to the outside bottom face of said body portion, a plunger carrier disposed within said hollow body portion, a plurality of plungers secured to said plunger holder and disposed partially within said cavity, said plungers correspond in number to said apertures and are so arranged as to be adapted to extend through said apertures, and a plunger actuator means adapted to move said plungers on said plunger carrier through said apertures to force minute drops of anti-ravel chemical out through said apertures onto said cutter blade.

References Cited by the Examiner

UNITED STATES PATENTS

| 543,930 | 8/1898 | Frye et al. | 83—169 |
| 1,266,058 | 5/1918 | Schmidt | 118—38 |
| 1,501,919 | 7/1924 | Peters | 83—659 |
| 1,779,876 | 10/1930 | Gay | 83—169 |
| 1,996,617 | 4/1935 | Hahn | 83—317 X |
| 2,112,443 | 3/1938 | Martoccio | 83—169 X |
| 2,405,598 | 8/1946 | Miller | 83—659 X |
| 2,413,016 | 12/1946 | Wiken et al. | 83—169 |
| 3,156,150 | 11/1964 | Sarka | 83—317 |
| 3,202,029 | 8/1965 | Morath | 83—317 X |
| 3,232,525 | 2/1966 | MacNeil | 83—169 X |

FOREIGN PATENTS

| 360,252 | 9/1922 | Germany. |
| 741,044 | 11/1955 | Great Britain. |
| 807,007 | 1/1959 | Great Britain. |

MORRIS KAPLAN, *Primary Examiner.*